Figure 1:
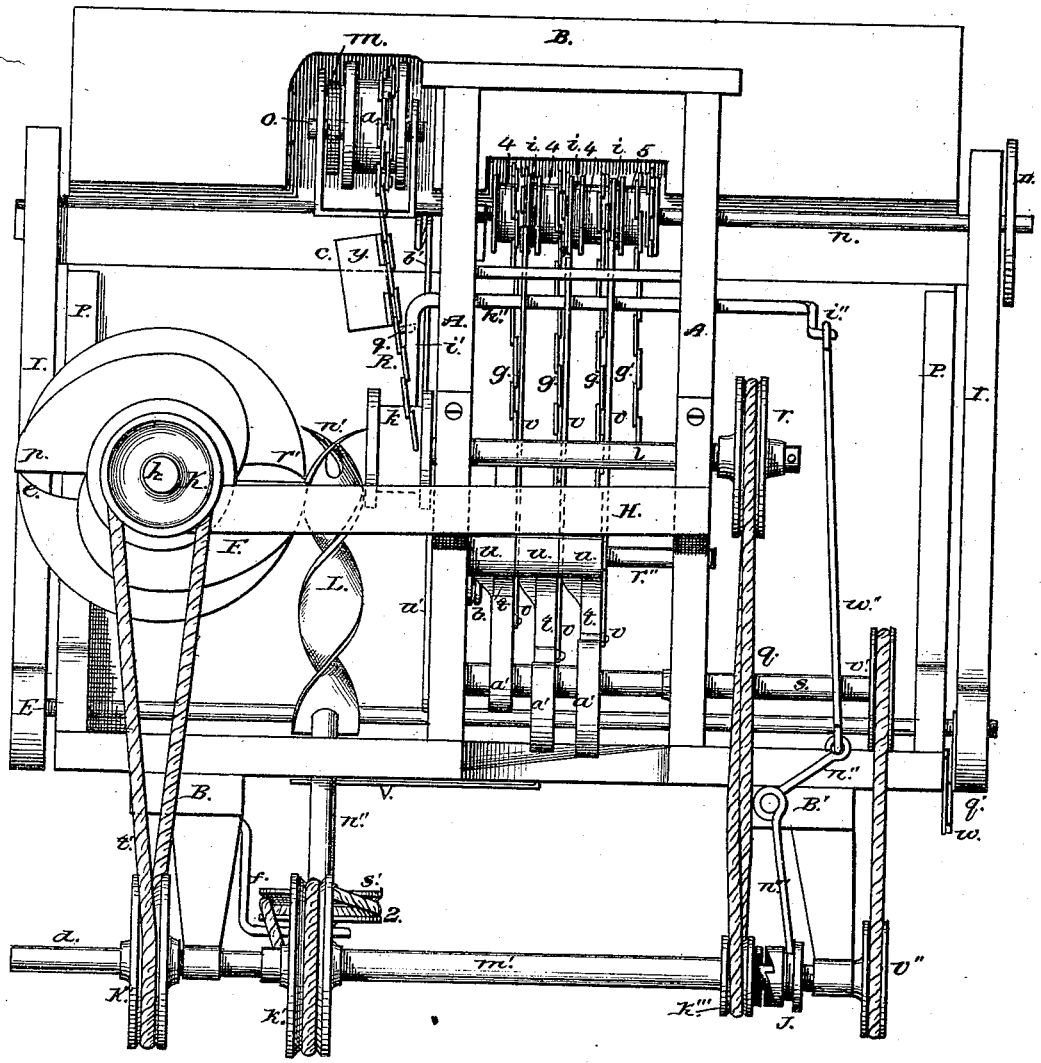

2 Sheets—Sheet 1.

H. H. BRIDENTHALL, Jr.
GRAIN-BINDER

No. 174,616. Patented March 14, 1876.

Witnesses:
Wm Cover.
H. A. Smith.

Inventor:
Harry H. Bridenthall, Jr.

N. PETERS, PHOTO-LITHOGRAPHER, WASHINGTON, D. C.

2 Sheets—Sheet 2.
H. H. BRIDENTHALL, Jr.
GRAIN-BINDER
No. 174,616. Patented March 14, 1876.
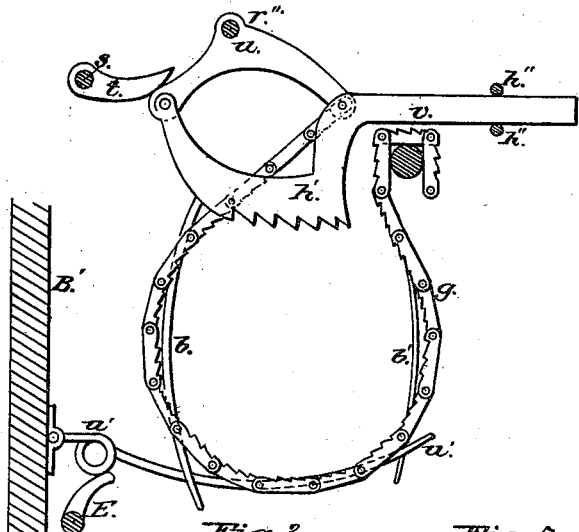
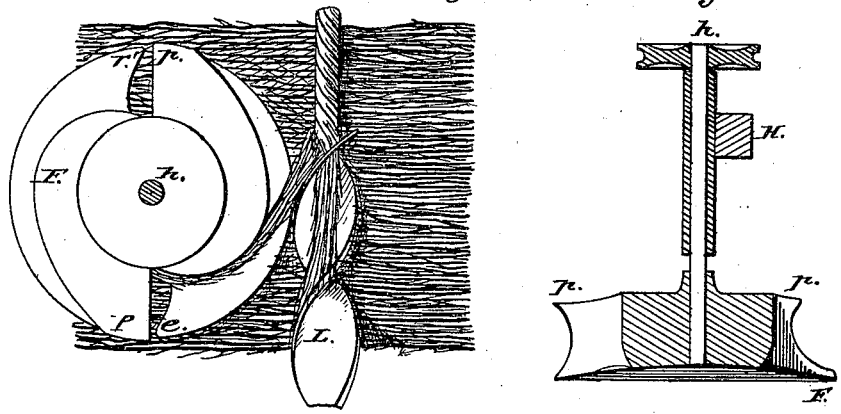
Witnesses:
Wm Cover
H. A. Smith
Inventor:
Harry H. Bridenthall, Jr.

UNITED STATES PATENT OFFICE.

HARRY H. BRIDENTHALL, JR., OF WESTMORELAND COUNTY, PA.

IMPROVEMENT IN GRAIN-BINDERS.

Specification forming part of Letters Patent No. 174,616, dated March 14, 1876; application filed March 22, 1875.

*To all whom it may concern:*

Be it known that I, HARRY H. BRIDENTHALL, JR., a resident of the county of Westmoreland, in the State of Pennsylvania, have invented certain new and useful Improvements in Grain-Binders; and I do hereby declare the following to be a clear and exact description thereof, reference being had to the drawings forming a part of this specification, in which—

Figure 1 is a top view of my improved machine, showing the general plan of the same. Fig. 2 is a detached vertical sectional view, showing the holding rotating devices. Fig. 3 is a detached top view, showing the operation of forming the band, and Fig. 4 shows the operation of connecting the ends of the said band and tucking under the knot. Fig. 5 is a vertical sectional view of the straw-lifter, showing its long adjustable sleeve-bearing.

Similar letters of reference, where they occur in the different figures, refer to like parts of the machine in all of the drawings.

The object of this invention is to furnish a grain-binder which will securely bind the grain into sheaves or bundles by means of the straw of the gavel, twisting the butt-ends thereof into a rope, and connecting the ends of the said rope, and which may be connected with or form a part of the ordinary reaper. It consists in a series of flexible chains or bands which are made to reciprocate circumferentially about the gavel, for the purpose of revolving it; in an auger-shaped twister for the purpose of twisting the rope or band of straw and knotting it; and in a revolving straw-lifter for the purpose of lifting and separating the wisps of straw from the gavel and conveying them to the twister; and it further consists in the combination of the particular elements employed.

To enable others skilled in the art to make and use my machine, I will proceed to describe the same with reference to the drawings.

B B and A designate the frame, and it supports the various elements which compress, rotate, and bind the grain. I do not, however, confine myself strictly to this form or arrangement of frame, as it is necessary to modify it so as to combine with or form a part of the harvester to which it is to be connected and whereof it receives motion.

The shaft $d$ is supported within bearings attached to the frame B B', and receives motion from the driving-wheels of the harvester, or otherwise, as may be desired. The pulleys $k''$ $v''$ are rigidly attached to the said shaft $d$, and the pulleys $k'$ $k'''$ are attached to the sleeve $m'$, which turns loosely upon the shaft $d$, except connected therewith by means of the clutch J. The said clutch J is operated by means of the arms and shaft $i'$ $i''$, rod $w'''$, and the pivoted shipper-lever $n'''$, as hereinafter described. The shaft S revolves in bearings within the overhanging frame A A, and receives motion from the shaft $d$ by means of belting and the pulleys $v'$ $v''$ between the overhanging frame rails A A, and rigidly connected with the shaft S is a series of cams, $t\,t\,t$, which radiate equidistant circumferentially about the said shaft S, and impinge against and vibrate the swinging bell-crank levers $u$ $u\,u$, which swing loosely upon the rod $r''$. To shorter arms of the said bell-crank lever $u$ are pivoted the curved and notched levers $v$, the opposite ends of which play loosely between the rods $h''\,h''$, and have for their purpose to assist in rotating the gavel. To the longer arms of the said bell-crank levers $u$ are pivoted the ends of the chains $g\,g\,g$. The chains $g$ are formed of flat links riveted and provided with teeth, the edges of which bear against the gavel, for the purpose of preventing them from slipping upon the bundle, except in one direction. The opposite ends of the chains $g$ are connected to the spools 4 4 4, which turn upon the shaft $n$, which is pivoted to the swinging frame I I C by means of suitable bearings thereon. The springs $i\,i\,i$ are connected with the spools 4, and the shaft $n$, and cause the said spools to wind thereon the slack of the chains $g$, and to enable the said chains $g$ to vibrate circumferentially about the gavel and revolve it. The chain $g'$ is attached to the overhanging frame A A, in line with the ends of the reciprocating chains $g$, and is smooth on its inner edge, so as to allow the gavel to slip around therein. The opposite end of the said chain $g'$ is attached to the spool 5, which is rigidly connected with the shaft $n$. The larger coil-spring D causes the shaft $n$ to revolve so as to wind the slack of the chain $g'$ upon the stationary spool 5.

By this construction unequal-sized gavels may be taken into the compressor, and compressed with equal tension. When a large-sized gavel is taken the stationary chain $g'$ unwinds, causing the shaft $n$ to revolve, unwinding the chains $g\ g\ g$, thereby relieving the smaller springs $i\ i\ i$ of undue tension.

To the shaft $l$ is attached the spool $k$, and receives motion from the shaft $d$ by means of the belt $q$, and pulleys $k'$ and $r$. One end of the chain R is connected with the spool $k$, and the opposite end is attached to the spool $a$, which is pivoted to the swinging bar $c$ by suitable bearings thereon. The chain R is kept wound upon the spool $a$ by means of the coil-spring $m$. To the said chain R, near the spool $k$, is attached the hinged leaf $y$, and has for its purpose to clamp the first-formed end of the band against the gavel, holding and guiding it so as to come around to the twister, to be caught by the said twister, in order to form the necessary connection. To the upper side of the overhanging frame A A is attached the arm H, which supports the bearing of the vertical shaft $h$, which receives motion from the shaft $d$ by means of the belt $t'$, and the pulley $k$. To the lower end of the said shaft $h$ is attached the revolving straw-lifter F, at each revolution of which the points $e\ r'$ take up a little of the straw from the outside of the gavel, near the twister L, and in passing around toward the butt of the gavel separate the wisp from the said gavel. The upper or cam-shaped part of the lifter $p$ carries the wisps to the twister, to be formed or twisted into a band. The twister L is attached to the shaft $n''$, which has its bearing in the arm $f$, and in a vertical slot bearing in the frame B. The spring V serves to hold the shaft $n''$ against the upper extremity of the slotted bearing. Motion is communicated to the twister-shaft by means of the belt S', and the pulleys $k'$ and 2. The twister L is formed in the shape of a double and deeply threaded screw, or the barrel of an ordinary auger, and provided with the curved tines $n'$, which twist the straw into a rope upon the gavel, as it is revolved in the manner shown in Fig. 3. $b, b'$, and $w'$ are flexible arms or tines, which bear against the gavel, as it is revolved by the chains before described, for the purpose of steadying it. The arm $b'$ is attached to the bar $c$; $b$ is rigidly attached to the overhanging frame A, and $w'$ is hinged to the back or frame B', in a manner that, when the compressor is open, it drops upon the bottom, and is out of the way when the compressor is closed. The arm $x$ raises the said tine or finger $w$ against gavel. All of these fingers are provided with one or more coils, for the purpose of increasing their flexibility. The arms I I are rigidly connected to the shaft E and the bar $c$, forming a quadrangular frame. The shaft E is provided with bearings in the brackets P P, the frame I C being governed by means of the arm $q$ and the toggle-arms $w'$, which may be operated by any suitable means in connection with the gearing of the harvester.

The operations of my machine are as follows: A gavel of grain is swept from the platform B over the spools $a$, 4, and 5, upon the chains $g, g'$, and R. The toggle-arms $w'$ are now brought into action, raising the frame I C, thus bringing the series of chains around the gavel. The rigid chain $g'$, by unwinding, regulates the relative position of the shaft $n$, and the springs and spools $i\ i$ 4 4, as before described. The clutch J is made to connect the sleeve $m$ with the revolving shaft $d$, thus bringing into action the spool $k$ and the twister L, the former of which winds on the chain R, causing it to assist in revolving the gavel. The cams $t\ t\ t$, each in succession, move the bell-crank levers $u\ u\ u$ with their chains $g$ and levers $h$, each of the series causing the gavel to revolve a short distance. When the end of a cam, $t$, slips past the end of a lever, $u$, its respective spool 4, by means of its spring $i$, withdraws the chain, when its teeth take a new hold upon the gavel and turn it, while others of the series are being withdrawn for a new hold. By using a greater or a less number of chains or bands an intermittent rotary motion may be given to the gavel, thus giving the periphery of the gavel a slower motion, and enabling the band to be twisted hard or slack, as may be desired. The straw-lifter now takes up a wisp of straw from the gavel, which is separated therefrom and carried to the twister, as before described. A short piece of band being formed, the leaf $y$ comes down upon it by means of the chain R, and holds it against the bundle, as before described, and, in coming around, the twister catches the free end of the band, which projects beyond the leaf $y$, thus twisting the two ends of the band together. The hinged leaf $y$, coming between the twister and the band, prevents the said twister from taking up more than a specific amount of the first-formed end of the band. The hinge in the leaf $y$ enables it to be easily withdrawn from the twisted knot, which is accomplished by the part of the chain R to which it is connected leaving the bundle. The twister then takes hold of the band, carrying it over the knot, as shown in Fig. 4, forming a tuck. The pin 9 upon the chain R raises the arm $i'$, thereby, as before described, releasing the clutch J. The toggle-arms $w$ are withdrawn, lowering the frame I I C to its first position. The twister having stopped revolving the sheaf pulls it downward, when it slips out of the knot without undoing it, by making a turn or two backward, when the spring V raises the said twister to its first position, and the bound sheaf is discharged. The coil-spring $m$ causes the spool $a$ to rewind the chain R from the spool $k$, and the machine is ready for another gavel. The vertical shaft $h$, with the revolving lifter-disk F, is provided with a vertical movement within its sleeve-bearing, thereby allowing the lower edge of the periphery of the disk-lifter to rest upon the gavel by its own gravity, and adjust itself to the position of the gavel. The twister L is also provided with a vertical movement independent of the spring V, which allows the tined end of the said twister L to rest upon the gavel as the band is being twisted. By this construction the lifter F is enabled to always take up the same quantity of straw from the gavel, thus making the band of a regular size.

Having thus described all that is necessary to a full understanding of my invention, what I claim as new, and desire to secure by Letters Patent, is—

1. In combination with the frame B and the spool-shafts $o$ $n$, the shaft E, toggle-arms $w$, arms I I, and the bar $c$, these members being constructed and operating in combination, substantially as and for the purposes set forth.

2. The reciprocating bands $g$, in combination with each other and with the bell-cranks $u$, levers $v$, and the reversing-spools 4, substantially as and for the purposes herein specified.

3. In combination with the chains or bands $g$ and the shaft S, the cams $t$ $t$ $t$, bell-crank levers $u$ $u$ $u$, notched levers $v$ $v$ $v$, as and for the purpose set forth.

4. In combination with the reciprocating bands $g$ and the bar $c$, the stationary chain $g'$, spool and shaft $n$ 5, spools 4, and the springs $i$ and D, substantially as and for the purposes set forth.

5. The chain R holding leaf $y$, spools $a$ $k$, reversing-spring $m$, in combination with each other and with the binder L, rotating bands $g$, and the shaft $l$, substantially as and for the purposes herein set forth.

6. The combination of the chain R, shipper-gears $i'$ $w''$ $n''$, clutch J, chain-gear $k'''$ $r$, and the binder-gear $k'$ 2, these members constructed and operating substantially as and for the purposes herein specified.

7. The herein-described band-twister, consisting of twisted blade L, terminating with the spiral tines $n'$, in combination with the adjustable shaft $n''$ and the spring V, substantially as and for the purposes herein specified.

8. In combination with the band-twister L, or its equivalent, the adjustable revolving straw-lifter F, substantially as and for the purposes herein specified.

9. In combination with a holding and rotating device composed of flexible chain or bands, as herein specified, the flexible steadying-fingers $b$ $b'$ and $u^1$, substantially as and for the purpose set forth.

HARRY H. BRIDENTHALL, Jr.

Attest:
WILLIAM COVER,
H. A. SMITH.